(12) United States Patent
Goerzen (10) Patent No.: US 8,379,066 B2
(45) Date of Patent: Feb. 19, 2013

(54) METHOD AND APPARATUS FOR SCALING AN IMAGE TO PRODUCE A SCALED IMAGE

(75) Inventor: Lawrence Goerzen, Ontario (CA)

(73) Assignee: Christie Digital Systems USA, Inc., Cypress, CA (US)

( * ) Notice: Subject to any disclaimer, the term of this patent is extended or adjusted under 35 U.S.C. 154(b) by 1333 days.

(21) Appl. No.: 11/819,478

(22) Filed: Jun. 27, 2007

(65) Prior Publication Data

US 2009/0002398 A1    Jan. 1, 2009

(51) Int. Cl.
*G09G 5/02*       (2006.01)
(52) U.S. Cl. .......... 345/698; 345/399; 345/3.3; 715/238
(58) Field of Classification Search .................. 345/660, 345/426, 428, 592, 606, 611, 613, 698, 699, 345/3.3
See application file for complete search history.

(56) References Cited

U.S. PATENT DOCUMENTS

| | | | | |
|---|---|---|---|---|
| 5,331,430 | A * | 7/1994 | Xie et al. ........................ | 358/3.1 |
| 5,426,723 | A * | 6/1995 | Horsley .......................... | 345/428 |
| 5,489,952 | A * | 2/1996 | Gove et al. ..................... | 348/771 |
| 5,644,325 | A * | 7/1997 | King et al. ....................... | 345/20 |
| 5,703,621 | A * | 12/1997 | Martin et al. ................... | 345/690 |
| 2002/0005862 | A1 * | 1/2002 | Deering ......................... | 345/694 |
| 2003/0215156 | A1 | 11/2003 | Rieger | |
| 2005/0052618 | A1 * | 3/2005 | Ulichney et al. ................ | 353/30 |
| 2005/0185859 | A1 * | 8/2005 | Thoms ........................... | 382/298 |

FOREIGN PATENT DOCUMENTS

| | | |
|---|---|---|
| EP | 0 710 925 A2 | 5/1996 |
| JP | 07-073302 | 3/1995 |
| JP | 10-255033 | 9/1998 |
| JP | 2003-153133 | 5/2003 |
| JP | 2004-77545 | 3/2004 |
| JP | 2007-156585 | 6/2007 |

OTHER PUBLICATIONS

Aho et al., "Comments on Winscale: An Image-Scaling Algorithm Using An Area Pixel Model", IEEE Transaction on Circuits and Systems for Video Technology, IEEE Service Center, Piscataway, NJ, US, vol. 15, No. 3, Mar. 1, 2005, pp. 454-455.
Chun-Ho Kim et al.,"Winscale: An Image-Scaling Algorithm using an Area Pixel Model", EEE Transaction on Circuits and Systems for Video Technology, IEEE Service Center, Piscataway, NJ, US, vol. 13, No. 6, Jun. 1, 2003.
European Search Report mailed Jul. 7, 2009 in corresponding European Patent Application 08 01 1735.
Japanese Office Action mailed Dec. 11, 2012 in corresponding Japanese Application No. 2008-166103.

* cited by examiner

*Primary Examiner* — Michelle L Sams
(74) *Attorney, Agent, or Firm* — Staas & Halsey LLP (57) ABSTRACT

According to embodiments described in the specification, a method, and apparatus for scaling an image to produce a scaled image is described, the image comprising an array of image pixels, and the scaled image comprising an array of scaled pixels. In a first step a map is created between the array of scaled pixels and the array of image pixels. In a second step, an energy parameter of each image pixel in the array of image pixels is determined. In a third step, a fraction of a given image pixel which overlaps a given scaled pixel in the array of scaled pixels is determined for each image pixel, in the array of image pixels. In a final step the energy parameter of the given image pixel is distributed between scaled pixels which overlap the given image pixel, the distributing based on the fraction, such that the energy parameter is conserved.

47 Claims, 7 Drawing Sheets

METHOD AND APPARATUS FOR SCALING AN IMAGE TO PRODUCE A SCALED IMAGE

FIELD

The specification relates generally to image processing, and specifically to a method and apparatus of scaling an image to produce a scaled image.

BACKGROUND

Digital images are generally composed of a 2 dimensional array of pixels. Different image formats may have different resolutions of pixels, for example, 1920×1080, 720×480, 1280×1024, etc. Very often these images need to be converted from one format to another format in order to display the image on a digital display device, which tend to have a fixed output format. Examples of digital display devices with fixed formats may include digital projectors, including digital projection televisions, and digital display monitors (e.g. liquid crystal displays, plasma displays, and the like). Digital images arriving at the digital display device may arrive in any format and must be scaled to match the display's output format. Scaling from a higher resolution format to a lower resolution format is known as downscaling, while scaling from a lower resolution format to a higher resolution format is known as upscaling. Scaling may also be applied to parts of an image, to improve the appearance of an image when it is projected at off-perpendicular angles, or onto an irregular surface, for example by keystoning the image. These types of corrections are known as geometric corrections.

The usual method used to scale an image is to first represent the input image as a series of points (1 pixel=1 point), and generate a curve fit to the points, with all of the light energy in each pixel represented by a corresponding point on the curve. Some algorithms only include the nearest input pixels to generate the curve, while other algorithms include more distant input pixels, to generate a better curve. Once the curve is generated, the output pixels (which make up the output image), are mapped onto the curve, with the value of any given output pixel determined by its location on the curve. However, this technique leads to many artefacts in the output image. For example, if an input pixel falls midway between two output pixels, the total energy transfer from that input pixel to the output will be different than if the input pixel were mapped near an output pixel. This results in some areas of the image where edges are undesirably brighter and others where edges are undesirably dimmer. Further, while the inclusion of more distant input pixels may generate a better curve, input pixels distant from a given output pixel may then have a significant impact on the given output pixel, creating image artefacts such as ringing, overshoot, etc.

A particular problem exists for input images which contain high frequency information (i.e. abrupt transitions from light to dark, or from one colour to another), as the scaling process produces aliasing artefacts in the output image, which appear as undesirable lower frequency images superimposed over the desired image. Many aliasing artefacts are frequency effects proportional to the difference between the input and output pixel rates. While these effects can be seen on still images, they are not always noticed because the viewer may not be able to tell if what they are seeing is a scaling artefact or just part of the original image. However, aliasing artefacts become noticeable in video images, particularly when elements in the input image move slowly across the screen: the artefacts may move at a different speed and in a different direction than the desired elements in the output image, and draw the user's eye to them. For example, they may appear as ripples or flashing in the image. The techniques used to reduce the intensity of these artefacts, usually involve complex filters which require significant electrical resources when implemented in a real time image processing application.

Hence there is a need for a method and apparatus for scaling an image to produce a scaled image by distributing the energy of image pixels between the scaled pixels such that the energy of the image pixels is conserved.

SUMMARY

A broad aspect of an embodiment seeks to provide a method of scaling an image to produce a scaled image, the image comprising an array of image pixels, and the scaled image comprising an array of scaled pixels. A first step of the method comprises creating a map between the array of scaled pixels and the array of image pixels. A second step of the method comprises determining an energy parameter of each image pixel in the array of image pixels. A third step of the method comprises determining a fraction of a given image pixel which overlaps a given scaled pixel in the array of scaled pixels, for each image pixel in the array of image pixels. A final step of the method comprises distributing the energy parameter of the given image pixel between scaled pixels which overlap said given image pixel, the distributing based on the fraction, such that said energy parameter is conserved. In a particular aspect, determining an energy parameter of each image pixel in the array of image pixels comprising determining an intensity profile of said each given image pixel, and integrating the intensity profile.

Another broad aspect of an embodiment seeks to provide a display apparatus. A first element of the display apparatus comprises an interface for accepting an image from an image source. A second element of the display apparatus comprises an image processor in communication with the interface for scaling the image to produce a scaled image, the image comprising an array of image pixels, and the scaled image comprising an array of scaled pixels, by: creating a map between the array of scaled pixels and the array of image pixels; determining an energy parameter of each image pixel in the array of image pixels; determining a fraction of a given image pixel which overlaps a given scaled pixel in the array of scaled pixels, for each image pixel in the array of image pixels; and distributing the energy parameter of the given image pixel between scaled pixels which overlap the given image pixel, the distributing based on the fraction, such that the energy parameter is conserved. A third element of the display apparatus comprises an image display unit in communication with the image processor for displaying the scaled image.

BRIEF DESCRIPTIONS OF THE DRAWINGS

Embodiments are described with reference to the following figures, in which.

DETAILED DESCRIPTION OF THE EMBODIMENTS

Figure 1:
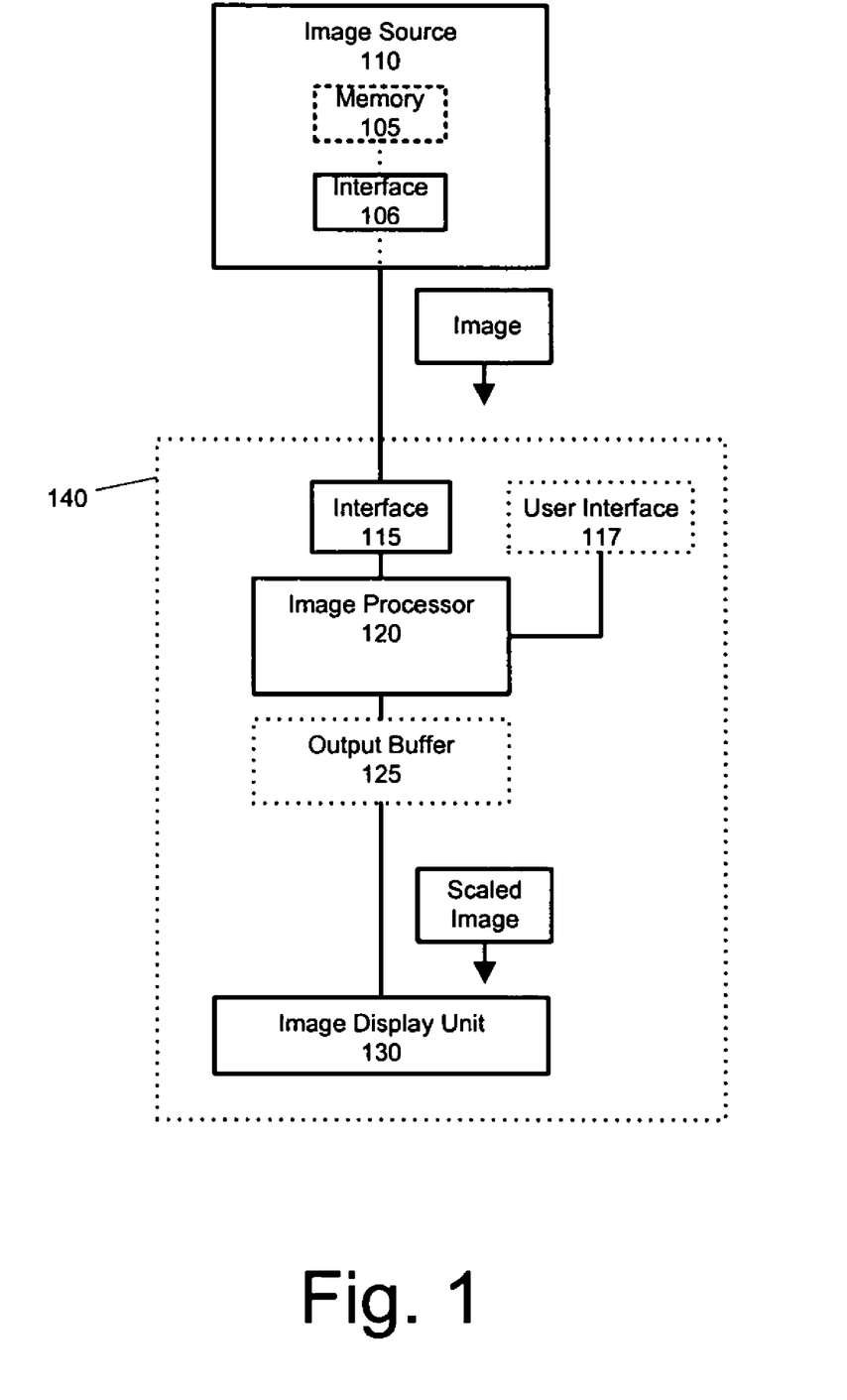
FIG. 1 depicts an apparatus for scaling an image to produce a scaled image, according to a non-limiting embodiment.

FIG. 1 depicts a system for scaling an image, to produce a scaled image. In some embodiments, the image will be of a first resolution, while the scaled image will be of a second resolution. In other embodiments, the scaled image may represent a geometric correction of the image. An image processor 120, for scaling the image to produce the scaled image, is coupled to an image source 110 via an interface 115. In some embodiments, the scaled image is stored in an output buffer 125, prior to releasing the scaled image to an image display unit 130. In other embodiments, the image processor 120 is in further communication with a user interface 117, for accepting data from a user. In these embodiments, the image processor 120 is enabled to process data received from the user interface 117. In the depicted embodiment, the interface 115, the image processor 120, and the image display unit 130 (and the output buffer 125, and the user interface 117 if present) are elements of an apparatus 140, however in other embodiments, the interface 115, the image processor 120, and the image display unit 130 (and the output buffer 125, and the user interface 117 if present) may be distributed between other apparatus (not depicted). In one non-limiting example, the image processor 120, the interface 115, the output buffer 125 and the user interface 117 may be elements of a computing device for image and/or computational processing, and the image display unit 130 may be a standalone apparatus. In embodiments which include the apparatus 140, the apparatus 140 may further comprise the image source 110.

The image source 110 may comprise a device for providing displayable images including, but not limited to, devices for generating and/or storing images. In some embodiments, the image source 110 may comprise a computing device, for example a personal computer, a server or an image server, while in other embodiments, the image source 110 may comprise a camera for producing the image, including but not limited to a digital camera, an analog video camera, a digital video camera, or a combination of the above. In yet further embodiments, the image may be stored in a file, or in random or sequentially accessed memory. In some of these embodiments, the file may be stored on portable media, such a magnetic disc, an optical disc (e.g. a DVD or CD), or a USB flash memory, and the like. In these embodiments, the image source 110 may comprise a portable media player (not depicted). Non-limiting example of a portable media player include a CD player, a DVD player, a USB port combined with software to play image files stored on a USB flash memory, and the like.

In some embodiments, the image source 110 may further comprise a memory 105 for storing the image prior to transmitting the image to the image processor 120, however in other embodiments the image is not stored in memory and is transmitted to the image processor 120 upon production of the image, for example as a video signal (described below). The image source 110 comprises an interface 106 for coupling the image source 110 to the image processor 120. The interface 110 may comprise a wired or a wireless interface (described below).

The image may comprise a still image or a video image. The image may be stored in a memory, for example the memory 105, and can be accessed directly from a memory as an array of pixels, or it can be received and processed as a stream of pixels. The image may also comprise an analog image or a digital embodiment, where the image is stored in a file, the file may comprise a digital file. The digital file may comprise a still image digital file in any format, including but not limited to, a TIFF file, a JPEG file, or a GIF file etc. In other embodiments, the digital file may comprise a video image digital file, including but not limited to MPEG formats, including but not limited to MPEG-1, MPEG-2, MPEG-3 and MPEG-4, and other formats, including but not limited to H.261, H.263, H.264, Theora, D1, D2, D3, D5, D9, DV, MiniDV, DVCAM, DVCPRO etc.). In yet other embodiments, the image may comprise a data stream of a suitable format that is transmitted to the apparatus 140, for example a video stream transmitted to the apparatus 140. In these embodiments the image may comprise an analog image or a digital image, for example an analog video stream or a digital video stream respectively.

In embodiments where the image comprises a digital image, the image is comprised of an array of pixels, the pixels arranged into rows and columns, each pixel representing a small area of the image, as known to one of skill in art. In embodiments, where the image comprises an analog image, the analog image is first digitized (i.e. converted) to an array of pixels prior to scaling the image to produce the scaled image. Each pixel, is associated with pixel data which, when received by the image display unit 130, will enable the image display unit 130 to display each pixel at a location on the image display unit 130, and hence display the image. Hence, a pixel position is associated with each pixel, such that the image display unit 130 understands where to display each pixel. In some embodiments, the pixel data comprises the pixel position, while in other embodiments the pixel position is defined by the format of the image. For example, in embodiments where the image is stored as a digital file, the pixel position may be understood by the order in which the pixel data is stored within the digital file. Similarly, in embodiments where the image comprises a data stream, the pixel position may be understood by the order in which the pixel data is received within the video stream.

In some embodiments, pixel data associated with the top left pixel of the image is stored first within the data file, or transmitted in the data stream, with subsequent pixels in the top row stored in sequence. When the pixel data associated with the last pixel in the top row is stored (i.e. the top right pixel), in some embodiments, the next pixel data stored is associated with the pixel immediately beneath the last pixel in the top row (i.e. the right most pixel in the second row). Remaining pixel data is stored in a similar manner, with pixel data stored row by row proceeding from left to right, and then right to left, across the image, in alternating rows, until the bottom of the image is reached. In other embodiments the remaining pixel data is stored with pixel data stored row by row, proceeding from left to right for each row.

The pixel data comprises data which will instruct the image display unit 130 of the intensity of the pixel. In some embodiments, the pixel data 130 comprises data which will instruct the image display unit 130 of the absolute intensity of the pixel, while in other embodiments, comprises data which will instruct the image display unit 130 of the relative intensity of the pixel. In some embodiments the pixel data further comprises data which will instruct the image display unit 130 of the color of the pixel. In some embodiments, the pixel data comprise an index into a table of colors, the table of colors stored at either the image processor 120 or the image display unit 130. In other embodiments, the pixel data may comprise an absolute intensity value for each color. The intensity for each color can have any bit depth or resolution. The intensity & color data can be in RGB (Red, Green, Blue) format or with the colors combined in any other way (YPbPr etc.). In some embodiments, data to be shared across pixels (or lines as in 4:2:2 format) where pairs of pixels share the same color. In one non-limiting example, the pixel data comprises data in 10 bit RGB format in gamma space and in 16 bit in linear space, such that in linear space pixel data for all three colors (RGB) comprise 48 bits/pixels. In another non-limiting example, the pixel data comprises an 8 bit number, the 8 bit number representative of the intensity of the pixel as it is to be displayed.

Similarly, the scaled image is comprised of an array of pixels, the pixels arranged into rows and columns, and each pixel representing a small area of the scaled image.

The interface 115 is enabled to couple the image processor 120 to the image source 110, and may comprise any interface that allows an image in any format to be transferred from the image source 110, including a wired or a wireless interface. In embodiments where the interface 115 comprises a wired interface, the interface 115 may include, but is not limited to, a Digital Visual Interface (DVI), a High Definition Multimedia Interface (HDMI), an analog RGB interface, a YPbPr interface, a Composite interface, an Separate-Video (S-Video) interface, a serial interface (e.g. RS-232 or other serial interface), a parallel interface (e.g. Parallel SCSI or other parallel interface), an ethernet interface, or a combination of the above. In embodiments where the interface 115 comprises a wireless interface, the interface 115 may include, but is not limited to, a WiFi Interface, a WiMax Interface, a wireless telephone interface (e.g. CDMA, 1X, EVDO, GSM, UTMS etc.), or a combination of the above.

Similarly the interface 106 may comprise a wired or a wireless interface, and may be similar to the interface 115.

The image processor 120 comprises a processor for processing images, including but limited to scaling the image to produce the scaled image. Other functions of the image processor 120 may include an on screen display (OSD), a color space converter, edge blending, image filters, including noise filters, sharpness filters and Nyquist filters, and the like. In embodiments where the image comprises an analog image, the image processor 120 may be further enabled to convert the analog image to a digital image prior to scaling the image. In some embodiments, the image processor 120 may be in communication with a central processing unit (not depicted) for controlling other components of the apparatus 140 (if applicable) and/or the image display unit 130, and/or other components of the system. In other embodiments, the image processor 120 may be a component of the central processing unit.

In embodiments, which include an output buffer 125, the output buffer 125 may be a separate element from the image processor 120 (as depicted), while in other embodiments, the image processor 120 may comprise the output buffer 125 (not depicted). In any event, the output buffer 125 may store the scaled image, or a portion of the scaled image, prior to releasing the scaled image to the image display unit 130. In these embodiments, the image processor 120 may scale the image in portions, producing portions of the scaled image in a sequence. In a non-limiting example, in some embodiments, the image processor 120 may scale the image row by row, hence producing the scaled image row by row. As each row of the scaled image is produced, it may be released to the output buffer 125. In embodiments where the image comprises a video image, the image processor 120 may scale the image frame by frame, hence producing the scaled image frame by frame. As each frame of the scaled image is scaled, it may be released to the output buffer 125.

The portions of the scaled image may be stored at the output buffer 125, and released to the image display unit 130 when all of the portions, or a sufficient number of portions, of the scaled image are received. In these embodiments, the output buffer 125 may further assemble the scaled image prior to releasing the scaled image to the image display unit 130

The image display unit 130 comprises a device for displaying images, including but not limited to the scaled image. The image display unit 130 may comprise a digital display apparatus including, but not limited to, a digital projector apparatus, and a digital display, for example a liquid crystal display or a plasma display. In these embodiments, the image display unit 130 will generally be configured to display images of only certain resolutions, hence the need to scale the image to the scaled image for display by the image display unit 130. In embodiments where the digital display apparatus comprises a digital projector apparatus, the digital projector apparatus may comprise a projector apparatus for projecting images onto a surface, including a projection television screen. In some embodiments, the image may be of a resolution which is displayable by the image display unit 130. In these embodiments, for example in embodiments where the image display unit 130 comprises a digital projector apparatus, a portion of the image may be scaled by the image processor 120 to account for the geometric corrections required when projecting the scaled image onto an irregular surface (described below).

In some embodiments, the image display unit 130 may comprise an analog image display apparatus for example a television, or monitor, comprising a cathode ray tube (CRT). In these embodiments, the image display unit 130 may be further enabled to convert the generally digital scaled image to an analog image for display. However in other embodiments, the image processor 120 may be enabled to convert the generally digital scaled image to an analog image prior to releasing the scaled image to the image display unit 130.

In embodiments which include the apparatus 140, the apparatus 140 may comprise a device which incorporates the interface 114, the image processor 120, the output buffer 125 (if present), the user interface 117 (if present) and the image display unit 130. In some embodiments, the apparatus 140 may comprise a digital projector, as sold Christie Digital Systems Canada, Inc., 809 Wellington St. N., Kitchener, Ontario N2G 4Y7.

A method of scaling the image to produce the scaled image is now described with reference to FIG. 2. The method of FIG. 2 may be performed by the image processor 120. The method of FIG. 2 may also be performed in a distributed manner by different elements of the system depicted in FIG. 1. In this method, each pixel in the image (i.e. image pixels) is processed, not as a point, but as a finite area which radiates a specific amount of light energy. In general, the concept is to map all of the energy of the image pixels to at least one of the closest pixels in the scaled image (i.e. scaled pixels). When each image pixel is mapped to at least one scaled pixel, the energy of the image pixel is divided into parts, with each part assigned to a different scaled pixel, where it is added to the energy contributed by other image pixels. How the energy of an image pixel is assigned is based on the relative overlap area between the image pixels and the scaled pixels. In some embodiments, the relative overlap area is determined by the boundaries of the image pixels, relative to the boundaries of the scaled pixels. Within some embodiments, it is assumed that there are no spaces between the pixels of either the image or the scaled image.

Hence, at step 210 the image is received, for example from the image source 110. At step 215, a map is created between each scaled pixel and each image pixel. In a non-limiting embodiment, creating the map comprises determining the start boundary of the first pixel in each row or column of each of the image and the scaled image, and determining the end boundary of the first pixel in each row or column of each of the image and the scaled image, and assuming that the start and end boundaries align. The boundaries of each image pixel are then determined relative to the boundaries of each scaled pixel, and the boundaries of each scaled pixel are determined relative to the boundaries of each image pixel. Within the non-limiting example of FIG. 3, the relative positions of the boundaries are depicted as dotted lines. In some embodiments, step 215 may follow step 220.

At step 220 an energy parameter of each image pixel is determined. In some embodiments, the energy parameter may comprise the absolute energy of an image pixel, while in other embodiments, the energy parameter may comprise the relative energy of an image pixel. In many embodiments, determining the relative energy of an image pixel is sufficient for processing described in further steps in the method of FIG. 2, as the intensity value for a pixel is generally proportional to the energy of a pixel, as known to one of skill in the art. Furthermore, the absolute intensity (and hence the energy) of an image pixel may be dependent on the image display unit 130. Furthermore the energy of a pixel is proportional to the intensity. The energy parameter of each image pixel may be determined in a single step, while in other embodiments the energy parameter of each image pixel may be performed concurrently with other processing steps.

The energy parameter of an image pixel may be determined by integrating the area under a curve of intensity vs. area (i.e. pixel intensity profile) for each image pixel. In the simplest case the energy of the pixel can be assumed to be distributed evenly over the area of the image pixel. Alternatively the intensity profile across the area of the pixel can be assumed can assume many shapes and can overlap with neighbouring pixels for a smoother image. The shape of the pixel can be arbitrary as in bi-linear or Gaussian curves, or it can be dependent on the intensity of any other nearby pixels, as is the case for edge or object detection methods or filters. As discussed, the pixel data comprises data which will instruct the image display unit 130 of the intensity of each pixel. In some embodiments, the pixel data may further comprise information describing the pixel intensity profile across the area of the pixel. However in other embodiments, a constant pixel intensity profile may be used. In yet other embodiments, non-constant pixel intensity profiles may be used to correct for pixelation artefacts (discussed below). In embodiments where a constant pixel intensity profile is used, integrating the area under a curve of intensity vs. area for each image pixel may comprise: determining an area of each image pixel; determining the intensity of each image pixel; and multiplying the area by the intensity of the image pixel. Where non-constant intensity profiles are used the area under the intensity curve (or the volume under the intensity surface) must be integrated over the area where the scaled pixel overlaps with the image pixel. In some embodiments, the area of the image pixel may be an absolute area, while in other embodiments, the area of the image pixel may be a relative area (see below).

Figure 3:
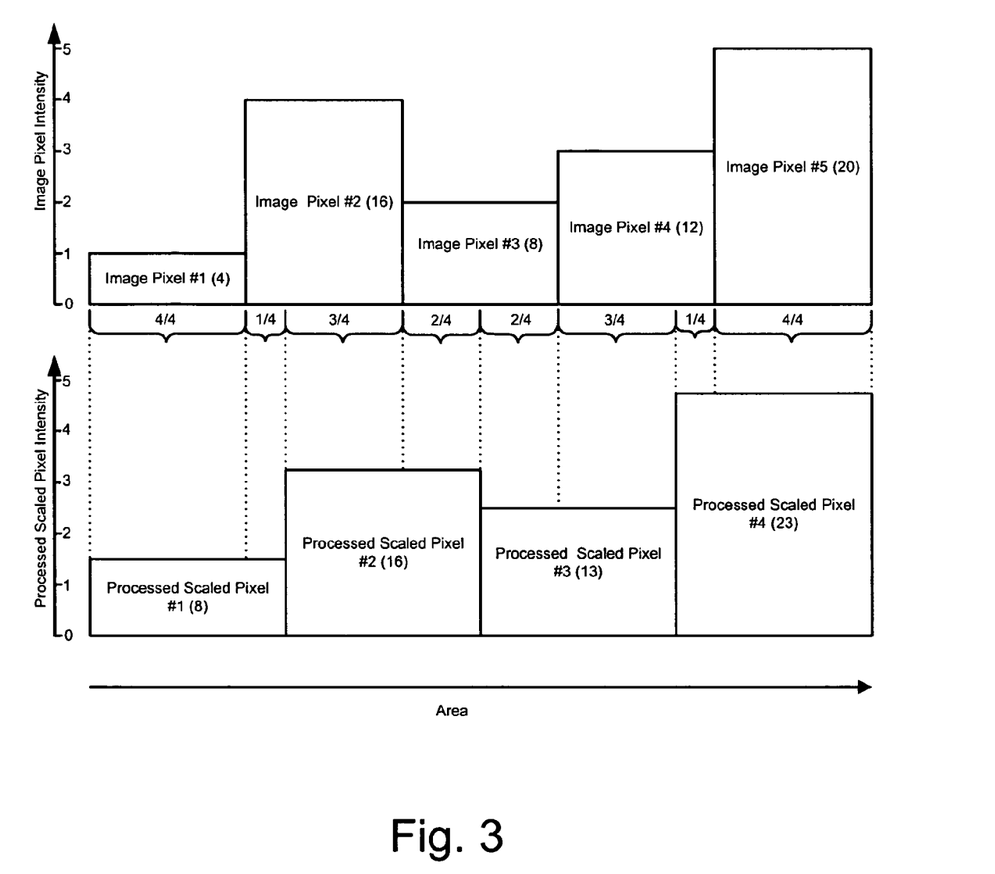
FIG. 3 depicts a non-limiting example of scaling an image to produce a scaled image, according to a non-limiting embodiment.

To illustrate this embodiment, consider the example depicted in FIG. 3, which depicts an image comprised of a 1×5 array (i.e. one row and five columns) which is to be scaled to produce a scaled image comprised of a 1×4 array (i.e. one row and four columns). The image and the scaled image are plotted as intensity vs. area for each pixel. Within this example, the energy present in the 1×5 array must be divided and assigned to the scaled pixels of the 1×4 array. Hence, relatively speaking, each pixel in the 1×4 array is assumed to have an area that is 5/4 (125%) larger than each pixel in the 1×5 array. In some embodiments, spaces that may exist between pixels are ignored, as depicted.

In some embodiments, an arbitrary area unit is assigned to each image pixel. For example, in FIG. 3, each image pixel may be assigned a relative area of 1 areal unit. Hence, the relative area of the scaled pixels would be 1.25 areal units (i.e. 5/4 times 1).

However, in a later step (step 250) the overlap area between the image pixels and the scaled pixels will be determined. Hence in some embodiments, it is convenient for computational purposes to choose an areal unit which will ensure that the boundaries of the each of the image pixels and the scaled pixels, overlap an areal unit boundary. In other words, an areal unit is chosen such that each of the image pixels and each of the scaled pixels is an integer number of areal units.

Hence, in FIG. 3, if each image pixel is assigned an area of 4 areal units, each scaled pixel then has an area of 5/4 times the area of the image pixels, or 5 areal units.

In some embodiments, the areal unit which results in the relative area being an integer number of areal units for both the image pixels and the scaled pixels is known as a subpixel. Hence in these embodiments, in the example depicted in FIG. 3 the relative area of each image pixel is 4 subpixels, and the relative area of each scaled pixel is 5 subpixels. It is noted, then, that each of the arrays will have an equal number of subpixels.

In some embodiments, the number of subpixels assigned to each image pixel will be determined based on the relative resolution between the image and the scale image, as described above. However, in other embodiments, the image processor 120 may assign a fixed number of subpixels, N, to each image pixel which arrives at the image processor 120. Each scaled pixel is then expressed as an integer multiple of 1/N subpixels, such that the boundaries of the scaled pixels will always fall on a subpixel boundary of the image pixels. In general a larger N, will better result in meeting this condition, and each row (or column) of the image and the corresponding row (or column) of the scaled image will each contain an equal number of subpixels. In one non-limiting embodiment, each image pixel is assigned a relative area of N=256 subpixels.

However, in these embodiments, it may sometimes be difficult to assign an equal number of 1/N subpixels to each scaled pixel in the row (or column). In these embodiments, the number of subpixels assigned to each scaled pixel may vary, to correct for these variations, and to ensure that each row (or column) has an equal number of subpixels as the corresponding row (or column) in the image. For example, some of the scaled pixels may be assigned a first number of subpixels, while other scaled pixels may be assigned a second number of subpixels.

To illustrate this, consider an image comprising an array of 1×1280 image pixels that is to be downscaled to an array of 1×720 scaled pixels, and where each image pixel is assumed to have a relative area of 256 subpixels, for a total of 1280× 256=327,680 subpixels. Hence 327,680 subpixels must be divided among 720 scaled pixels, or 455.11 subpixels per scaled pixel. As 455.11 is not an integer, some scaled pixels are assigned a relative area of 455 subpixels, while others are assigned a relative area of 456 subpixels. It may be shown using simple algebra, that if 640 of the 720 scaled pixels are assigned a relative area of 455 subpixels, and if 80 of the 720 scaled pixels are assigned a relative area of 456 subpixels, the total number of subpixels in the scaled image is 327,680, as required.

Continuing the discussion on determination of the energy parameter, the intensity of each image pixel must also be determined. As the pixel data comprises data which will instruct the image display unit 130 of the intensity of the pixel, the intensity may be determined by processing the pixel data associated with each image pixel. Hence to calculate the energy parameter of each image pixel, the intensity of each image pixel is multiplied by the relative area of each image pixel.

Returning to the, non-limiting example of FIG. 3, Image Pixel #1 has an area of 4 areal units and the intensity of Image Pixel #1 is 1 intensity unit. Hence the energy parameter of Image Pixel #1 is 4 energy units (depicted in brackets). Similarly, Image Pixel #2 has an area of 4 areal units and the intensity of Image Pixel #1 is 4 intensity units. Hence the energy parameter of Image Pixel #1 is 4 energy units (depicted in brackets). Similar calculations are made for the remaining pixels, such that Image Pixel #2 is determined to have 16 energy units, Image Pixel #3 is determined to have 8 energy units, Image Pixel #4 is determined to have 12 energy units, and Image Pixel #5 is determined to have 20 energy units, for a total of 60 energy units.

At step 250, the relative overlap area between pixels is determined. In one non-limiting embodiment, the relative overlap area is determined by processing the start and end boundaries of both the image pixels and the scaled pixels to determine which pixels overlap. The relative positions of the boundaries are then processed to determine the relative overlap area. Returning to FIG. 3, it is seen that the entirety of Image Pixel #1 falls within the boundaries of Scaled Pixel #1, hence the relative overlap area between Image Pixel #1 and Scaled Pixel #2 is 4 out of 4 areal units (depicted as 4/4 in FIG. 3), or "1". Further it is seen that 1 out of 4 areal units of Image Pixel #2 overlaps Scaled Pixel #1, and hence the relative overlap area between Image Pixel #1 and Scaled Pixel #2 is ¼. Similarly, it is seen that 3 out of 4 areal units of Image Pixel #2 overlaps Scaled Pixel #2, and hence the relative overlap area between Image Pixel #2 and Scaled Pixel #2 is ¾. Similar calculations are made for the remaining pixels. In embodiments, where step 240 proceeds step 220, step 250 may also proceed step 220.

At step 260, the energy parameter of each image pixel is assigned to the scaled pixels based on the relative overlap area: the fraction of each image pixel that overlaps each scaled pixel is used to determine the fraction of the energy parameter from each image pixel that is assigned to each scaled pixel. Returning again to the non-limiting example of FIG. 3, the energy parameter of Image Pixel #1 is 4 energy units, while the relative overlap area with Scaled Pixel #1 is "1". Hence 100% of the energy parameter of Image Pixel #1 is assigned to Scaled Pixel #1. Similarly, the energy parameter of Image Pixel #1 is 16 energy units, while the relative overlap area with Scaled Pixel #1 is ¼, and the relative overlap area with Scaled Pixel #1 is ¾. Hence, 25% of the energy parameter of Image Pixel #2 (4 energy units) is assigned to Scaled Pixel #1, and 75% of the energy parameter of Image Pixel #2 (12 energy units) is assigned to Scaled Pixel #2. No other image pixels overlap Scaled Pixel #1, and hence the total energy parameter assigned to Scaled Pixel #1 is 8 energy units (depicted in brackets). Similar calculations are made for the remaining pixels, such that 16 energy units are assigned to Scaled Pixel #2, 13 energy units are assigned to Scaled Pixel #3, and 23 energy units are assigned to Scaled Pixel #4, for a total of 60 energy units, the same number of energy units in the image pixels.

At step 270, the scaled image is released to the image display unit 130. In some embodiments, the scaled image may be released to the output buffer 125 prior to releasing the image to the image display unit 130. In other embodiments, portions of the image may be released to the output buffer 125 prior to releasing the image to the image display unit 130. In these embodiments, for example, as processing of each scaled pixel is completed, the scaled pixel is released to the output buffer 125, to await the arrival of the remaining scaled pixels. In yet other embodiments, the scaled image may not be released to the image display unit 130, but may be saved to a memory (not depicted) for later transmission or transport to the image display device 130, or another image display device.

In some embodiments, the image pixels may be processed as an array using linear algebra computations, while in other embodiments, each image pixel may be processed in a sequence, for example in embodiments where the image is received at the image processor 120 as a data stream. In some of these embodiments the image is received at the image processor 120 a line at a time, hence some a priori knowledge of the resolution of the image may be known to the image processor 120.

Figure 2:
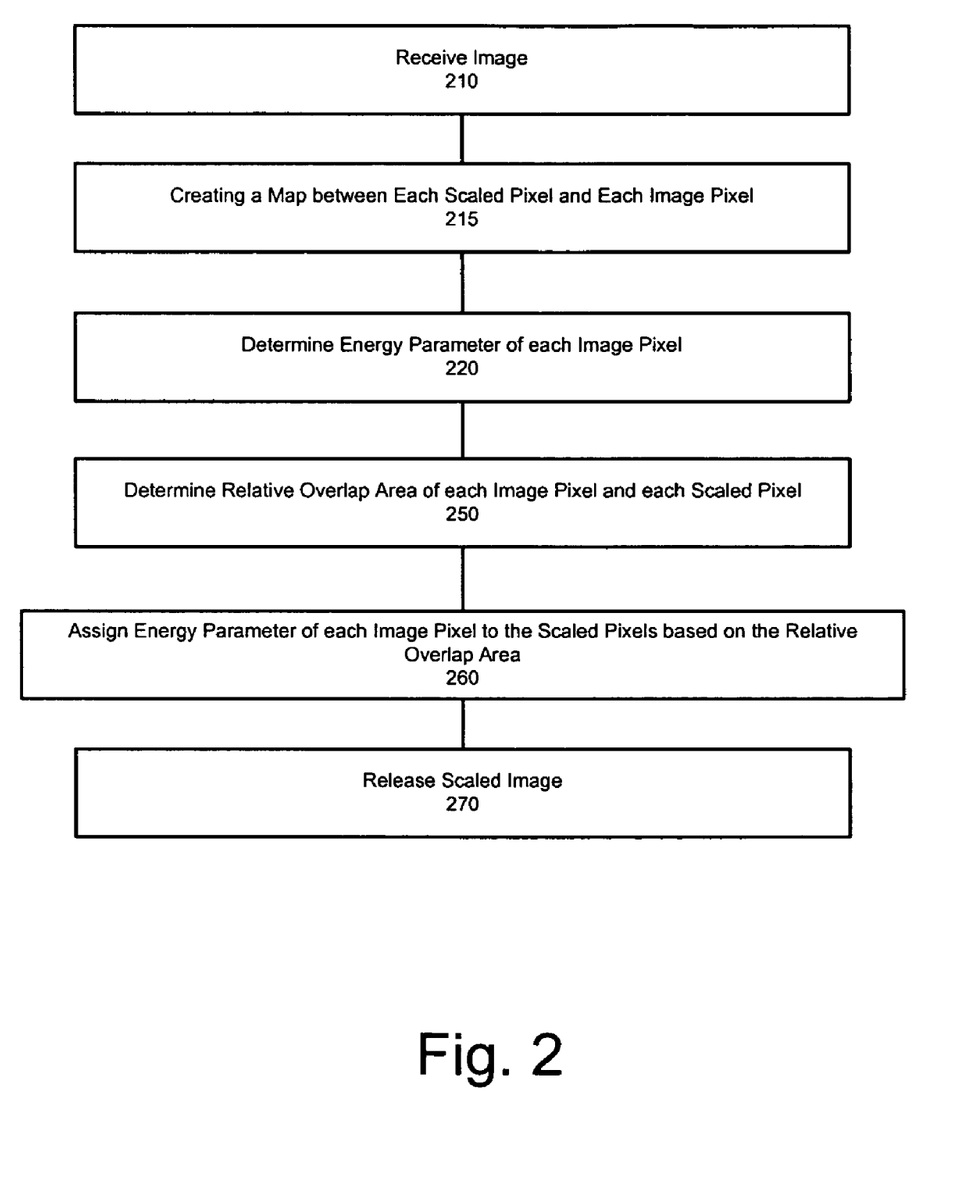
FIG. 2 depicts an method for scaling an image to produce a scaled image, according to a non-limiting embodiment.
Figure 4:
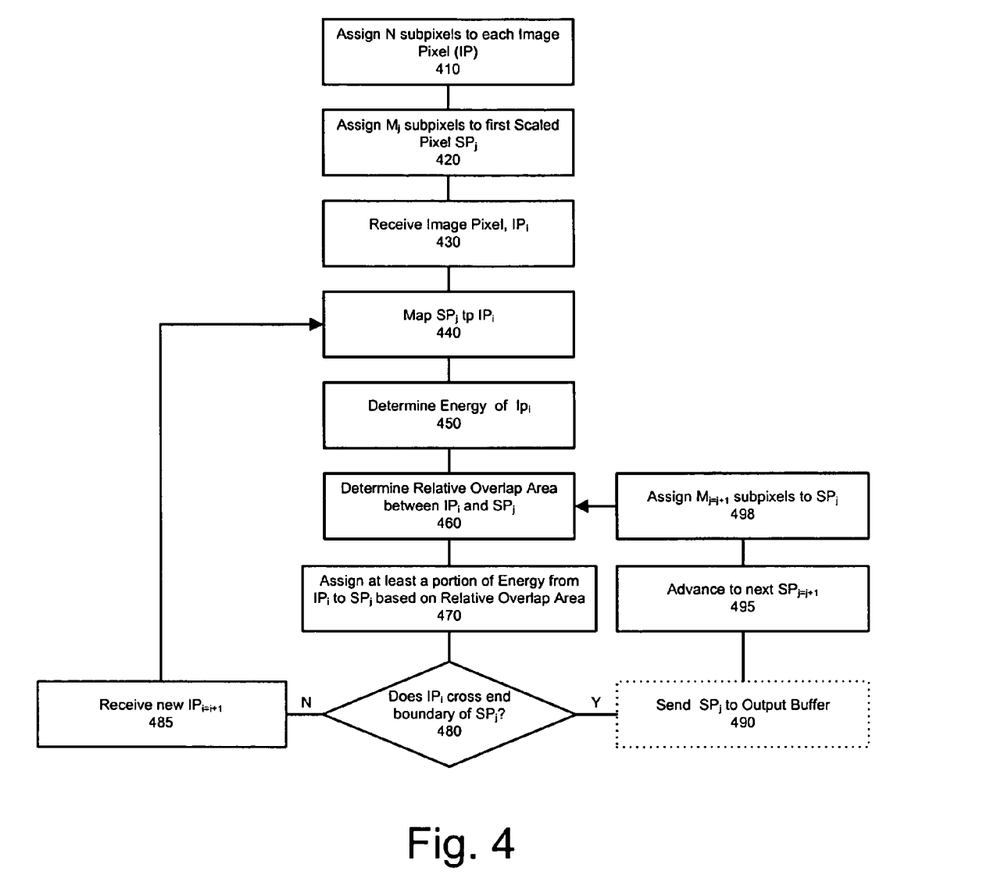
FIG. 4 depicts an method for scaling an image to produce a scaled image, according to a non-limiting embodiment.

FIG. 4 depicts a method for scaling an image to produce a scaled image, by processing image pixels in a sequence, and is a particular embodiment of the method of FIG. 2. As such, the method of FIG. 4 may be performed by the image processor 120. The method of FIG. 4 may also be performed in a distributed manner by different elements of the system depicted in FIG. 1. For this method, it is assumed that the resolution of the scaled pixels is known, for example the resolution of the scaled pixels may comprise a resolution of the image display unit 130 and/or a desired geometric correction. Also, some a priori knowledge of the resolution of the image is assumed, for example the resolution of each line. Further it is assumed that the image is received according to a standard, such that the position of each pixel in the image is known. For example, as described above, in video signals the top row of the image is the first row to be broadcast or transmitted, and further the pixels are generally transmitted left to right. Hence the image processor 120 will generally understand that the first image pixel received will be the image pixel that is in the top left hand corner of the image, etc.

At step 410, a number of subpixels, N, which are to be assigned to each image pixel is determined. As described above, the number of subpixels assigned to each image pixel may be a fixed number for each image which arrives at the image processor 120, or may be determined based on the scaling.

At step 420, a number of subpixels, $M_j$ is assigned to the first scaled pixel $SP_j$. The first scaled pixel $SP_j$ may be chosen based on the a priori knowledge of the first image pixel that is to be processed, and/or the desired scaling. In a non-limiting example, if the first image pixel to be scaled has a given position in the image (e.g. the upper left corner), then in some embodiments the first scaled pixel $SP_j$ is in the corresponding position of the scaled image (i.e. the upper left corner). However in embodiments where the scaled image is representative of a geometric correction of the image (discussed below), the first scaled pixel $SP_j$ may be in a different position than the corresponding position of the scaled image.

The number of subpixels $M_j$ assigned to $SP_j$ may be chosen in a manner similar to that described above.

At step 430 an image pixel $IP_i$ is received. At step 440, an energy parameter of $IP_i$ is determined in a manner similar to that described above.

At step 450, $SP_j$ is mapped to IPi to determine the relative positions of the pixel boundaries for both $SP_j$ and $IP_i$, in a manner similar to that described above. Similarly, at step 460, the relative overlap area between $SP_j$ and $IP_i$ is determined, and at step 470 at least a portion of the energy parameter of IPi, determined at step 440, is assigned to $SP_j$ based on the relative overlap area.

At step 480, it is determined if the end boundary of IPi crosses the end boundary of $SP_j$. If not, all of the energy parameter of $IP_i$ has been assigned and a new image pixel, $IP_{i=i+1}$ is received for scaling at step 485. The image processor 120 then determines the energy of the new $IP_i$ at step 440 and the processing continues as described above.

However, if the end boundary of $IP_i$ does cross the end boundary of $SP_j$, not all of the energy parameter of $IP_i$ has been assigned, as $IP_i$ overlaps more than one scaled pixel. Hence, at step 490, $SP_j$ is sent to the output buffer 125 (if present), as all of the image pixels which overlap it have been accounted for (i.e. no more energy parameters are to be assigned to $SP_j$), and at step 495 processing advances to the next $SP_{j=j+1}$, which is assigned a number of subpixels, $M_{j=j+1}$ at step 498, before the relative overlap area between $SP_j$ and $IP_i$ is determined at step 460. Processing then continues as described above.

In embodiments where an image to be scaled comprises a two dimensional array of rows of columns, scaling of the image to produce the scaled image, may be achieved in two applications of the method described in FIG. 2: first by scaling the image in one of a vertical direction or a horizontal direction, to produce an intermediate scaled image; and by then scaling the intermediate scaled image in the other direction to produce the scaled image. In other words the columns (or rows) of the image may be scaled first, followed by scaling of the rows (or columns).

Figures 5, 5A, 5B, 5C:
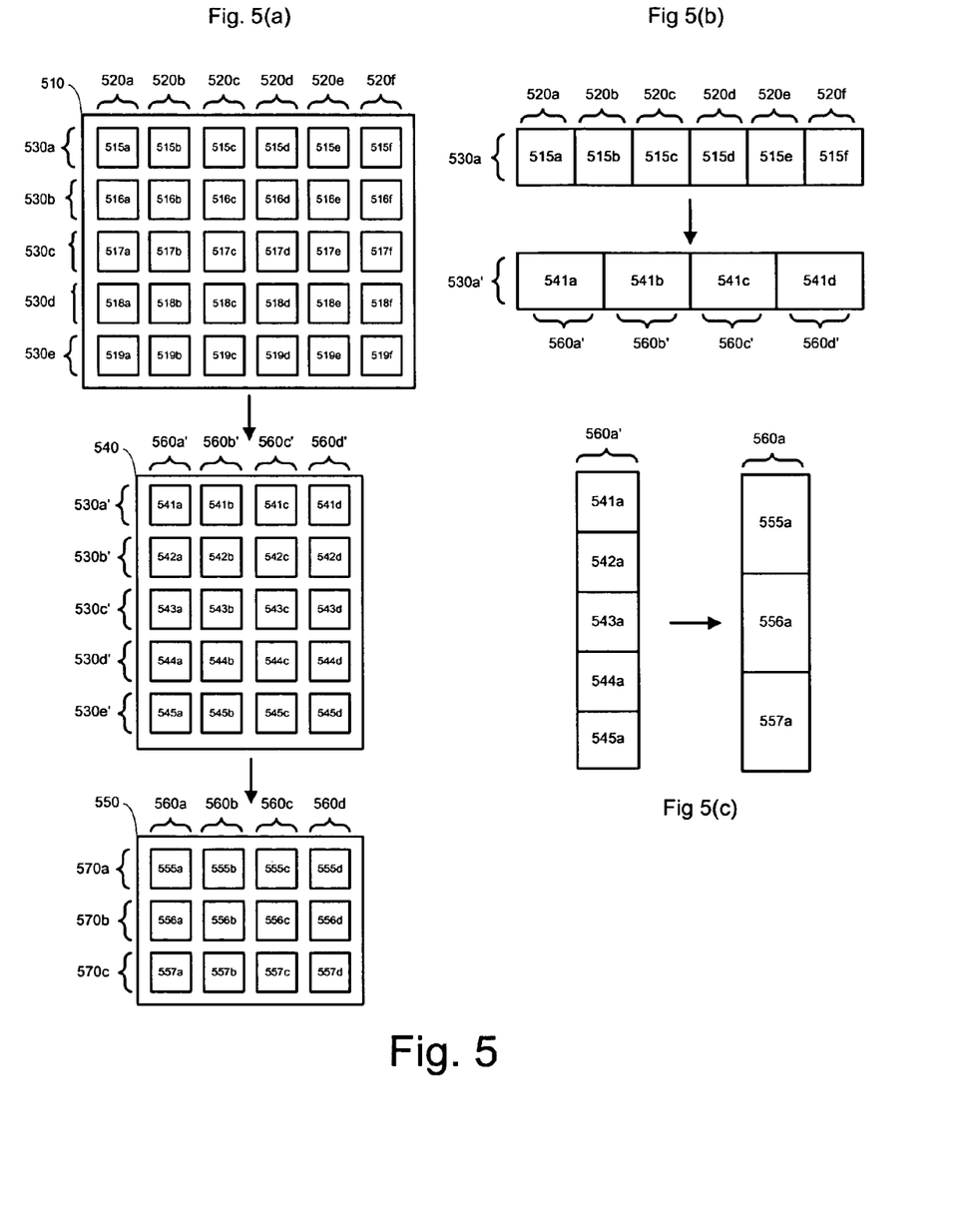
FIG. 5 depicts a non-limiting example of scaling an image to produce a scaled image, according to a non-limiting embodiment.

This is illustrated in FIG. 5 which depicts, under the letter "A", an image 510 comprising pixels, 515*a*, 515*b*, etc. arranged into 6 columns, 520*a*, 520*b*, 520*c*, 520*d*, 520*e*, 520*f* and 5 rows, 530*a*, 530*b*, 530*c*, 530*d*, 530*e* (i.e. a 6×5 array). Within this example, the image 510 is to be scaled to produce a scaled image 550 comprising pixels, 555*a*, 555*b*, etc. arranged into 4 columns, 560*a*, 560*b*, 560*c*, 560*d* and 3 rows, 570*a*, 570*b*, 570*c* (i.e. a 4×3 array). An intermediate scaled image 540 comprising pixels 541*a*, 541*b*, etc. arranged into 4 columns, 560*a'*, 560*b'*, 560*c'*, 560*d'* and 5 rows, 530*a'*, 530*b'*, 530*c'*, 530*d'*, 530*e'* (i.e. a 4×5 array) is also depicted. Each of the image 510, the intermediate scaled image 540, and the scaled image 550 is depicted as it would appear to an observer, each pixel having an absolute area, and space between each pixel.

FIG. 5 further depicts, under the letter "B", the process of scaling each column in the row 530*a* of the image 510 to produce row 530*a'* of the intermediate scaled image 540, and the process of scaling each column in the row 560*a'* of the intermediate scaled image 540 to produce row 560*a* of the scaled image 550, according to the method of FIG. 2.

To scale the image 510, to produce the intermediate scaled image 540, each column of the image 510 is first scaled to produce each column of the intermediate scaled image 540, on a row by row basis. For example, under the letter "B", row 530*a* is depicted in a manner similar to the image pixels depicted in FIG. 3, with no spaces between columns. To scale each column of row 530*a*, each pixel of row 530*a'* is mapped onto each pixel of row 530*a'*, in a manner similar to that of FIG. 3, and the relative overlap area is determined. An energy parameter of each pixel of row 530*a* is assigned to each pixel in row 530*a'*, based on the relative overlap area. The process is then repeated for each subsequent row of the image 510, to produce the intermediate scaled image 540.

Similarly, to scale the intermediate scaled image 540 to produce the scaled image 550, each row of the intermediate scaled image 540 is scaled to produce each row of the scaled image 550, on a column by column basis. For example, under the letter "B", row 560*a'* is depicted in a manner similar to the image pixels depicted in FIG. 3 (however, rotated by 90°), with no spaces between rows. To scale each row of column 560*a'*, each pixel of column 560*a'* is mapped onto each pixel of column 560*a*, in a manner similar to that of FIG. 3, and the relative overlap area is determined. An energy parameter of each pixel of column 560*a'* is assigned to each pixel in row 560*a*, based on the overlap area. The process is then repeated for each subsequent column of the intermediate scaled image 540, to produce the scaled image 550.

While the example depicted in FIG. 5 is described with reference to applying the method of FIG. 2 to first the columns, and then the rows, of the image 510, in other embodiments, the method of FIG. 2 may be applied to first the rows and then the columns of the image 510. In yet other embodiments, the scaling of the rows and columns may be applied in both dimensions before proceeding to the next pixel, processing each pixel first as a member of one of a row or a column, and subsequently processing the pixel as a member of the other of the row or column. In these embodiments, the image processor 120 may further comprise a register to save the state of the scaling process of each pixel, as known to one of skill in the art. Data that may be saved to the register may include the current image pixel boundaries, scaled pixel boundaries, relative overlap areas, and the accumulated value of the energy parameter that has been assigned to each of the scaled pixels thus far.

The method of FIG. 2 has been described with respect to uniform scaling of an image to produce a scaled image: in other words, each row, and/or each column, of an image is scaled using the same scaling parameters. However in other embodiments, the method of FIG. 2 may also be applied to scaling an image non-uniformly to produce a scaled image, in order to account for geometric corrections; in other words different rows, and/or different columns, may be scaled using different scaling parameters. Each pixel may be scaled using different scaling parameters than any of the surrounding pixels. For example, in embodiments where the image display unit 130 comprises a projector apparatus, an image may be scaled non-uniformly to produce a scaled image, such that when the scaled image is projected onto a non-uniform surface or at an off-perpendicular angle, the projected scaled image appears uniform, to an observer.

For example, when an image is projected onto a flat surface from a projector apparatus which is not perpendicular to the horizontal or vertical centerline of the screen (too high or too low, too left or too right), the projected image appears skewed to an observer, such that rectilinear images will appear trapezoidal (or keystoned). To correct for the geometry of the projector apparatus, the image may be scaled non-uniformly prior to producing a scaled image that is itself trapezoidal, such that when the scaled image is projected it appears rectilinear to an observer. This correction is known as a keystone correction.

Similarly, when an image is projected onto a non-uniform surface such as a curved surface (concave or convex), a domed or spherical surface, a corner, or other non-uniform surface, the image may be scaled non-uniformly to produce a scaled image, such that when the scaled image is projected onto the non-uniform surface, the scaled image appears to be uniform to an observer. In some embodiments, the nature of the geometric correction applied to an image may be controlled by a user via the user interface 117, while in other embodiments the nature of the geometric correction may be controlled via a computing entity (not depicted) in communication with the image processor 120 via the interface 115, or a computing entity interface (not depicted). In some embodiments, the image source 110 may comprise the computing entity.

Figure 6:
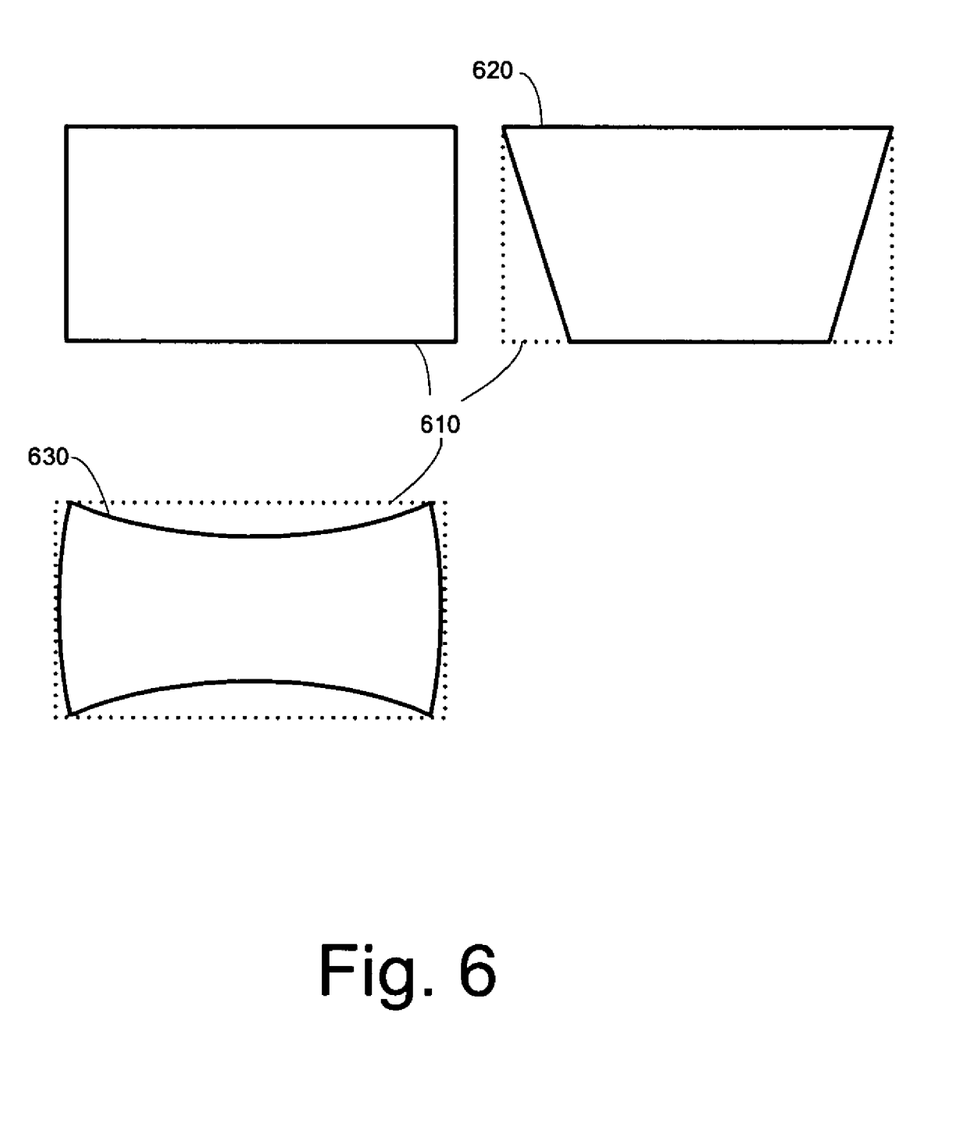
FIG. 6 depicts non-limiting examples of scaling an image to produce a scaled image, according to a non-limiting embodiment.

FIG. 6 depicts two non-limiting examples of geometric corrections that may be applied to an image 610 using the method of FIG. 2. For example, a keystone geometric correction may be applied to the image 610 to produce the scaled image 620, such that when the scaled image 620 is projected onto a flat surface from a projector apparatus which is above the horizontal perpendicular of the flat surface, the scaled image 620 appears rectilinear to an observer. To achieve this, the columns of each row of the image 610 are variably scaled using the method of FIG. 2, such that columns of each successive row in the image 610, from top to bottom, are downscaled to a slightly greater extent than each previous row. The image 610 is superimposed, in outline, on the scaled image 620 to indicate the relative scaling of the image 610.

Similarly, a curved screen geometric correction may be applied to the image 610 to produce the scaled image 630, such that when the scaled image 630 is projected onto a curved screen via a projector apparatus, the scaled image 630 appears rectilinear to an observer. To achieve this, the columns of each row of the image 610 are variably scaled using the method of FIG. 2, such that columns of each successive row in the image 610, from the top to the horizontal centreline of image 610, are downscaled to a slightly lesser extent than each previous row, the process reversing at the horizontal centreline. As well, the columns of each row of the image 610 are variably scaled using the method of FIG. 2, such that rows of each successive column in the image 610, from left to the vertical centreline of image 610, are downscaled to a slightly lesser extent than each previous column, the process reversing at the vertical centreline. The image 610 is superimposed, in outline, on the scaled image 620 to indicate the relative scaling.

In some embodiments, the difference in scaling between each line (row or column) to achieve to achieve the geometric correction may be quite small, for example, less than one pixel, and in some embodiments, less than one subpixel. In these embodiments, the image processor 120 may further comprise a position counter (including, but not limited to, a high resolution counter), to track the scaled pixel boundaries. In these embodiments, each pixel may be assigned a size (i.e. an integer number of subpixels) that brings the start and boundaries for the line (row or column), as close as possible to the ideal location. In these embodiments, each scaled pixel may be assigned a different number of subpixels, as described above, that gradually changes the scaling of successive lines by the desired amount. In one non-limiting example, the scaled pixel sizes may alternate between two values.

In another embodiment, a similar effect may be achieved by providing a size dithering function that is applied to successive lines. In some non-limiting embodiments, the size dithering function is provided via a table of size values. In some embodiments, the table of size values may be stored in a memory of the image processor 120 or the memory of another element of FIG. 1, while in other embodiments the table of size values may be stored in a database (not depicted) in communication with the image processor 120. In some embodiments, the table of size values contains the desired absolute size of each line in the scaled image while, in other embodiments, the table of size values contains the relative size of each line in the scaled image.

In embodiments that include non-uniform scaling of an image to produce a scaled image, an intensity correction may be applied to the pixels, before, during or after the scaling process, such that the pixels of the scaled image have a different intensity than the pixels of the image. In non-limiting example, consider the case of a top to bottom keystone correction, in which the image is projected upwards towards a flat screen. The uncorrected image appears wider at the top. When the keystone correction is applied, the top of the image is displayed using fewer pixels, so for the final image to appear uniform those pixels at the top must be brighter so that the total brightness along the top of the image remains constant. This is taken care of automatically when the image pixels are compressed into scaled pixels. Each image pixel takes all of its energy with it and since the top of the image gets compressed into fewer scaled pixels, those pixels are correspondingly brighter. This is a desirable effect because the geometry corrected image, when displayed on a curved or off-angle surface, will not only appear to have its original shape but also every part of the image will appear to the viewer to have its original intensity. However, when the pixels near the top of the image are at close to 100% intensity, the pixels near the top of the scaled image may be at >100% intensity. This may cause white level crushing, an effect known to one of skill in the art. To avoid this effect, in some embodiments the intensity of the image may be reduced in magnitude proportional to the maximum downscaling used anywhere in the image. In a non-limiting example, if some part of the image is downscaled by 80%, the intensity of the pixels of the image may be reduced by 80%. When the entire image is up-scaled an opposite effect occurs where the scaled image is dimmer than it needs to be. A similar correction may used in this instance. In other embodiments, a non-uniform change in the magnitude of the intensity may be applied to pixels of the image, for example in embodiments where the input image is also warped at the source so intensity compensation is not desired. In other embodiments, the full brightness possible for the final image is desired, even though the brightness is not uniform.

In embodiments where an image comprises a video signal, the intensity of the pixels in the image may have been previously transformed using a gamma function, for example $y=x^\gamma$, where $\gamma 0.45$. The use of a gamma transformed image data is common for most images although the exact value of gamma is not always the same. In some instances, the gamma curve is also not a simple curve but can contain linear segments or other distortions. While a $\gamma 0.45$ was originally chosen because CRT's have a gamma function that close to the inverse of $y=x^{0.45}$, it is now the standard for other displays as well, even though their natural gamma curve is quite different. In these embodiments, the application of the method of FIG. 2 to a gamma corrected image will result in artefacts in the scaled image due to the non-linear distribution of intensity that results from the gamma transformation. In some of these embodiments, prior to scaling the image to produce a scaled image, the image may be transformed back to "linear" space, for example by transforming the image using an inverse gamma function. Similarly, in embodiments where the image display unit 130 comprises a CRT, the scaled image may be transformed using a gamma function prior to displaying the scaled image at the image display unit 130.

In embodiments where scaling the image to produce a scaled image comprises upscaling the image, the scaled image comprises more pixels than the image. In these embodiments, artefacts which may exist in the image may be magnified in the scaled image. For example, a property of digital images formed from pixels is that the edges of diagonal lines are pixelated (i.e. stepped). When observed from a distance, the pixelation may not be noticeable to a viewer, however the process of upscaling results in a magnification of the pixelation in the scaled image.

In some embodiments, this may be corrected by applying an intensity profile correction to the image pixels, prior to scaling the image to produce the scaled image. In the example depicted in FIG. 3, each pixel is assumed to have an intensity profile that is uniform across the area of the pixel. However, the intensity profile of each image pixel may be corrected, as long as the total energy associated with each image pixel remains constant. In one non-limiting embodiment, pixels may also be spread out to overlap with neighbouring pixels. In these embodiments, the energy of each of the image pixels is spread out between adjacent pixels, prior to scaling the image to produce the scaled image. This results in smoothing the pixelation effects in the scaled image. In some embodiments, the scaled image may appear softer than it would if an intensity profile correction was not applied. In these embodiments, a sharpening filter may be applied to the scaled image to sharpen the scaled image, prior to displaying the scaled image at the image display unit 130.

Figure 7:
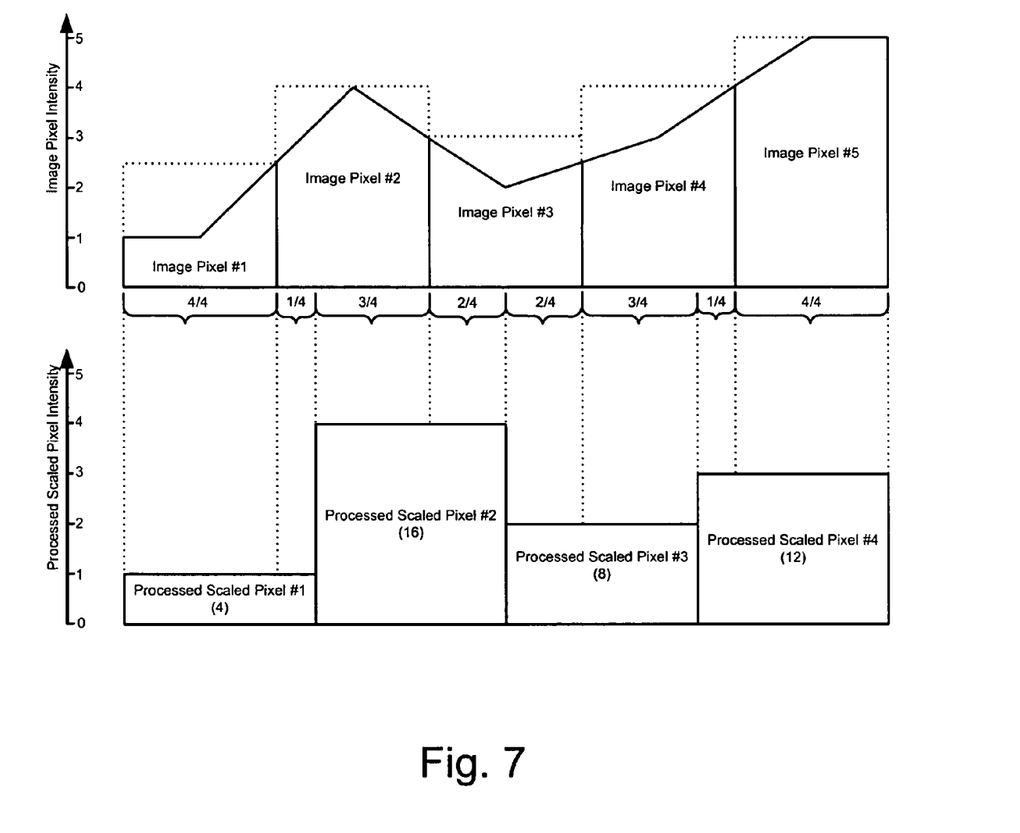
FIG. 7 depicts a non-limiting example of scaling an image to produce a scaled image, according to a non-limiting embodiment.

FIG. 7 depicts a non-limiting example of an adjustment to the intensity profile of the pixels of an image. The example of FIG. 7 is similar to the example of FIG. 3, however a linear adjustment to the intensity profile of each pixel has been applied prior to scaling the image to produce the scaled image. Initially each image pixel is assumed to have an intensity profile similar to the intensity profile of each image pixel in FIG. 3 (depicted in outline). Then the intensity of each image pixel is determined at the centre point of each image pixel. A line is then drawn from the centre point of each of each image pixel to the centre point of each adjacent pixel. Any intensity that lies above this line is reassigned to the adjacent pixel such that the line becomes the new intensity profile for each pixel. When determining the area of each image pixel (e.g. step 220 of the method of FIG. 2), the area under the line is integrated.

In other embodiments, other types of intensity profile corrections may be applied including using a Gaussian profile for the image intensity and an S-Curve image correction. In yet other embodiments, intensity profile corrections may be applied only to areas of the image where transitions (e.g. edges) exist. In some embodiments, the intensity profile correction may be applied to diagonal transitions/edges. Various 1D, 2D or 3D filters can also be applied to create an improved curve prior to integrating the area under it to generate the scaled pixels.

In yet other embodiments, an intensity profile corrections may be applied to images which are to be downscaled.

In yet other embodiments, the other types of corrections may be applied to the image, the scaled image or both, to alter the appearance of the scaled image. Types of corrections which may be applied include, but are not limited to, sharpening filters, pre-sharpening filters, noise reduction filters, and the like.

Hence, a method and apparatus for scaling an image to produce a scaled image by distributing the energy of image pixels between the scaled pixels such that the energy of the image pixels is conserved, has been described. The image may be up-scaled, down-scaled, twisted and/or distorted. By conserving energy, scaling artefacts are minimized, while preserving maximum image sharpness. The apparatus described comprises fewer hardware resources than previous techniques, and the method can therefore be implemented less expensively than previous techniques. The scaled images resulting from this technique are of very high quality with minimal artefacts and maxim clarity, particularly for moving images.

Those skilled in the art will appreciate that in some embodiments, the functionality of the image processor 120 may be implemented using pre-programmed hardware or firmware elements (e.g., application specific integrated circuits (ASICs), field programmable gate arrays (FPGAs), electrically erasable programmable read-only memories (EEPROMs), etc.), or other related components. In other embodiments, the functionality of the image processor 120 may be achieved using a computing apparatus that has access to a code memory (not shown) which stores computer-readable program code for operation of the computing apparatus. The computer-readable program code could be stored on a medium which is fixed, tangible and readable directly by these components, (e.g., removable diskette, CD-ROM, ROM, fixed disk, USB drive), or the computer-readable program code could be stored remotely but transmittable to these components via a modem or other interface device connected to a network (including, without limitation, the Internet) over a transmission medium. The transmission medium may be either a non-wireless medium (e.g., optical or analog communications lines) or a wireless medium (e.g., microwave, infrared, free-space optical or other transmission schemes) or a combination thereof.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

I claim:

1. A method of scaling an image to produce a scaled image, the image comprising an array of image pixels, and the scaled image comprising an array of scaled pixels, the method comprising,
creating a map between the array of scaled pixels and the array of image pixels in an image processor using at least two scaling factors, wherein the scaled image comprises a geometric correction of the image, such that when said scaled image is projected on a surface the scaled image is distorted to a shape similar to the image;
determining an energy parameter of each image pixel in the array of image pixels in said image processor, said energy parameter comprising at least one of absolute energy and relative energy;
determining a fraction of a given image pixel which overlaps a given scaled pixel in the array of scaled pixels, for each image pixel in the array of image pixels in said image processor;
distributing said energy parameter of said given image pixel between scaled pixels which overlap said given image pixel in said image processor while conserving said at least one of said absolute energy and said relative energy, said distributing based on said fraction, such that said energy parameter is conserved thereby reducing scaling artefacts when the scaled image is projected and distorted; and
releasing the scaled image, including said scaled pixels, to an image display unit for projection.

2. The method of claim 1, said creating a map between the array of scaled pixels and the array of image pixels, comprising:

determining said at least two scaling factor representative of the degree of scaling between said image and said scaled image;

processing each scaled pixel in the array of scaled pixels, using said at least two scaling factors, to produce an array of processed scaled pixels, each processed scaled pixel associated with a given scaled pixel in the array of scaled pixels, in a one-to-one relationship;

associating each processed scaled pixel in the array of processed scaled pixels, with a position in the array of image pixels.

3. The method of claim 2, further comprising eliminating spaces between the image pixels in the array of image pixels, such that a boundary of each image pixel aligns with a boundary of each adjacent image pixel, and eliminating spaces between the processed scaled pixels in the array of processed scaled pixels, such that a boundary of each processed scaled pixel aligns with a boundary of each adjacent processed scaled pixel.

4. The method of claim 2, said image having a first resolution, and said scaled image having a second resolution, and determining said at least two scaling factor comprises processing said first resolution and said second resolution.

5. The method of claim 4, wherein said array of image pixels comprises a given number of rows and a given number of columns, said first resolution comprising said given number of rows and said given number of columns, and wherein said array of scaled pixels comprises a given number of scaled rows and a given number of scaled columns, said second resolution comprising said given number of scaled rows and said given number of scaled columns, and processing said first resolution and said second resolution comprising at least one of determining a ratio between said at least one of said given number of rows and said given number of scaled rows to produce a row scaling factor, and determining a ratio between said given number of columns and said given number of scaled columns to produce a column scaling factor.

6. The method of claim 5, wherein said at least two scaling factors comprises said row scaling factor and said column scaling factor.

7. The method of claim 5, further comprising determining a plurality of scaling factors, said plurality of scaling factors comprising said at least two scaling factors, and further comprising said row scaling factor and a plurality of column scaling factors, each column scaling factor associated with a column in the array of image pixels.

8. The method of claim 5, further comprising determining a plurality of scaling factors, said plurality of scaling factors comprising said at least two scaling factors, and further comprising said column scaling factor and a plurality of row scaling factors, each row scaling factor associated with a row in the array of image pixels.

9. The method of claim 5, further comprising determining a plurality of scaling factors, said plurality of scaling factors comprising said at least two scaling factors, and further comprising a plurality of row scaling factors, each row scaling factor associated with a row in the array of image pixels, and a plurality of column scaling factors, each column scaling factor associated with a column in the array of image pixels.

10. The method of claim 2, wherein said processing each scaled pixel in the array of scaled pixels, using said at least two scaling factors, comprises proportionally adjusting an area parameter of each scaled pixel in the array of scaled pixels by at least one of said at least two scaling factors, to produce said array of processed scaled pixels.

11. The method of claim 10, wherein proportionally adjusting an area parameter of each scaled pixel in the array of scaled pixels by said at least one of said at least two scaling factors, to produce said array of processed scaled pixels aligns at least one boundary of said array of processed scaled pixels with at least one boundary of said array of image pixels.

12. The method of claim 10, wherein proportionally adjusting an area parameter of each scaled pixel in the array of scaled pixels by said at least one of said at least two scaling factors comprises increasing or decreasing said area parameter of each of said scaled pixel, to produce said array of processed scaled pixels.

13. The method of claim 11, further comprising dividing each image pixel into a first given number of subpixels, and proportionally adjusting an area parameter of each scaled pixel in the array of scaled pixels by said at least one of said at least two scaling factors comprises dividing each scale pixel into a second given number of subpixels, and adding or subtracting an approximately equal number of subpixels to each of said scaled pixels, to produce said array of processed scaled pixels.

14. The method of claim 13, wherein a first subset of processed scaled pixels in the array of processed scaled pixels comprises a first integer number of subpixels and a second subset of processed scaled pixels in the array of processed scaled pixels comprises a second integer number of subpixels.

15. The method of claim 14, wherein a dithering function is used to determine said first subset of processed scaled pixels and said second subset of processed scaled pixels.

16. The method of claim 15, wherein said dithering function comprises a table of size values.

17. The method of claim 16, wherein said size values comprise relative size values.

18. The method of claim 16, wherein said size values comprise absolute size values.

19. The method of claim 2, wherein associating each processed scaled pixel, in the array of processed scaled pixels, with a position in the array of image pixels comprises determining a position of each processed scaled pixel in the array of processed scaled pixels, associating said position of each processed scaled pixel in the array of processed scaled pixels with said position in the array of image pixels.

20. The method of claim 19, wherein said position in the array of image pixels is associated with a start boundary and an end boundary, and said position of each processed scaled pixel comprises at least one processed start boundary and at least one processed end boundary, and associating each processed scaled pixel in the array of processed scaled pixels, with a position in the array of image pixels further comprises:
   determining a relative position of said processed start boundary to said start boundary;
   determining a relative position of said processed start boundary to said end boundary;
   determining a relative position of said processed end boundary to said start boundary; and
   determining a relative position of said processed end boundary to said end boundary.

21. The method of claim 20, wherein determining a fraction of a given image pixel which overlaps a given scaled pixel in the array of scaled pixels, for each image pixel in the array of image pixels, comprises processing at least one of said relative position of said processed start boundary to said start boundary, said relative position of said processed start boundary to said end boundary, said relative position of said processed end boundary to said start boundary, and said relative position of said processed end boundary to said end boundary.

22. The method of claim 1, said determining an energy parameter of each image pixel in the array of image pixels comprising determining an intensity profile of said each given image pixel, and integrating said intensity profile.

23. The method of claim 22, wherein said energy parameter comprises a relative energy parameter.

24. The method of claim 22, wherein said energy parameter comprises an absolute energy parameter.

25. The method of claim 22 wherein said intensity profile comprises a constant intensity profile.

26. The method of claim 22, wherein pixel data is associated with said given image pixel, and determining an intensity profile comprises processing said pixel data to produce intensity data representative of said intensity profile.

27. The method of claim 26, wherein determining an intensity profile further comprises applying an intensity profile correction to said intensity data.

28. The method of claim 27, wherein said intensity profile correction comprises a linear intensity profile correction.

29. The method of claim 27, wherein said intensity profile correction comprises a Gaussian intensity profile correction.

30. The method of claim 27, wherein said intensity profile correction comprises at least one of an S-Curve intensity profile correction and a cubic spline function.

31. The method of claim 1, said determining a fraction of a given image pixel which overlaps a given scaled pixel in the array of scaled pixels, for each image pixel in the array of image pixels, comprises determining the relative overlapping area between said given image pixel and said given scaled pixel.

32. The method of claim 31, wherein each scaled pixel in the array of scaled pixels is associated with a processed scaled pixel, said processed scaled pixel determined by processing a scaled pixel in the array of scaled pixels with at least one of said at least two scalings factor, each of said at least two scaling factors representative of a degree of scaling between the image and the scaled image, said determining the relative overlapping area between said given image pixel and said given scaled pixel comprising determining the overlapping area between said given image pixel and a processed scaled pixel associated with said given scaled pixel.

33. The method of claim 1, said distributing said energy parameter of said given image pixel between scaled pixels which overlap said given image pixel, said distributing based on said fraction, comprising processing said fraction and said energy parameter.

34. The method of claim 1, further comprising receiving each image pixel in the array of image pixels in a sequence.

35. The method of claim 34, wherein, said creating a map between the array of scaled pixels and the array of image pixels comprises determining a subset of scaled pixels which overlap a given received image pixel and mapping only said subset of scaled pixels which overlap said given received image pixel to said given received image pixel.

36. The method of claim 35, wherein said determining an energy parameter of each image pixel in the array of image pixels, said determining a fraction of a given image pixel which overlaps a given scaled pixel in the array of scaled pixels, for each image pixel in the array of image pixels; and said distributing said energy parameter of said given image pixel between scaled pixels which overlap said given image pixel, said distributing based on said fraction occurs for each image pixel in the array of image pixels as it arrives in said sequence.

37. The method of claim 34, wherein said array of image pixels comprises a given number of rows and a given number of columns, and said sequence comprises a row by row rastering sequence.

38. The method of claim 37, wherein said row by row rastering sequence comprises alternating left to right rastering and right to left rastering.

39. The method of claim 37, wherein said row by row rastering sequence comprises left to right rastering.

40. The method of claim 1, wherein the image has been produced from an analog image.

41. The method of claim 1, further comprising processing said scaled image to produce an analog image for display on an analog image display device.

42. The method of claim 1, wherein said geometric correction comprises a keystone correction.

43. The method of claim 1, wherein said geometric correction comprises at least one of a dome correction, a corner correction, and a curved surface correction.

44. A display apparatus comprising,
an interface for accepting an image from an image source;
an image processor in communication with said interface for scaling the image to produce a scaled image, the image comprising an array of image pixels, and the scaled image comprising an array of scaled pixels, by creating a map between the array of scaled pixels and the array of image pixels using at least two scaling factors, wherein the scaled image comprises a geometric correction of the image, such that when said scaled image is projected on a surface the scaled image is distorted to a shape similar to the image, determining an energy parameter of each image pixel in the array of image pixels, said energy parameter comprising at least one of absolute energy and relative energy, determining a fraction of a given image pixel which overlaps a given scaled pixel in the array of scaled pixels, for each image pixel in the array of image pixels; and distributing said energy parameter of said given image pixel between scaled pixels which overlap said given image pixel while conserving said at least one of said absolute energy and said relative energy, said distributing based on said fraction, such that said energy parameter is conserved thereby reducing scaling artefacts when the scaled image is projected;
an image display unit in communication with said image processor for projecting the scaled image.

45. The display apparatus if claim 44, further comprising an output buffer for storing at least a portion of the scaled image prior to projecting the scaled image.

46. The display apparatus of claim 44, wherein said image display unit comprises an analog display unit and said image processor is further enabled to convert said scaled image to an analog scaled image.

47. The display apparatus of claim 44, wherein said image display unit comprises at least one of a digital image projection unit and an analog image projection unit.

* * * * *

UNITED STATES PATENT AND TRADEMARK OFFICE
CERTIFICATE OF CORRECTION

PATENT NO.        : 8,379,066 B2
APPLICATION NO.   : 11/819478
DATED             : February 19, 2013
INVENTOR(S)       : Lawrence Goerzen Page 1 of 1

It is certified that error appears in the above-identified patent and that said Letters Patent is hereby corrected as shown below:

In the Claims

Column 17, Line 1, In Claim 2, delete "factor" and insert -- factors --, therefor.
Column 17, Line 22, In Claim 4, delete "factor" and insert -- factors --, delete "comprises" and insert -- comprise --, therefor.
Column 18, Line 7, In Claim 12, delete "pixel" and insert -- pixels --, therefor.

Signed and Sealed this
Twenty-eighth Day of May, 2013

Teresa Stanek Rea
*Acting Director of the United States Patent and Trademark Office*